US008411800B2

(12) United States Patent
Tseng

(10) Patent No.: US 8,411,800 B2
(45) Date of Patent: Apr. 2, 2013

(54) TPS DECODER FOR DVB-T TELEVISION SYSTEM AND RECEIVER USING THE SAME

(75) Inventor: Chun-Chieh Tseng, Gueishan Township, Taoyuan County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 587 days.

(21) Appl. No.: 12/654,613

(22) Filed: Dec. 24, 2009

(65) Prior Publication Data

US 2010/0166092 A1   Jul. 1, 2010

(30) Foreign Application Priority Data

Dec. 25, 2008  (TW) .............................. 97150619 A

(51) Int. Cl.
    *H04L 27/06* (2006.01)
(52) U.S. Cl. ........................................ 375/340; 375/260
(58) Field of Classification Search .................. 375/260, 375/340
    See application file for complete search history.

(56) References Cited

U.S. PATENT DOCUMENTS

| 6,226,333 | B1 * | 5/2001 | Spalink ......................... 375/340 |
| 2009/0285163 | A1 * | 11/2009 | Zhang et al. .................. 370/329 |

* cited by examiner

*Primary Examiner* — Shuwang Liu
*Assistant Examiner* — David Huang
(74) *Attorney, Agent, or Firm* — Bacon & Thomas, PLLC

(57) ABSTRACT

A TPS decoder for a DVB-T digital television system includes an input signal estimator, a masking device, a vector index determinator and a lookup table device. The input signal estimator receives a plurality of frequency-domain input signals and a plurality of channel measure signals to thereby produce a plurality of estimated input signals. The masking device performs a masking operation on the estimated input signals to thereby produce a plurality of masking signals. The vector index determinator is based on the masking signals to determine a vector index corresponding to the frequency-domain input signals. The lookup table device is based on the vector index to produce a codeword.

10 Claims, 5 Drawing Sheets $l = 1$

| $x^m_{l,k}$ | $a^m_l \equiv b_k$ | $w_k$ |
|---|---|---|
| +1 | +1 | 0 |
| −1 | −1 | 1 |
| | Bipolar | Binary |

FIG. 3

$l \geq 1$

| $x^m_{l,k}$ | $a^m_l$ | $s^{(m)}_l$ |
|---|---|---|
| +1 | +1 | 0 |
| −1 | −1 | 1 |

FIG. 4

TPS DECODER FOR DVB-T TELEVISION SYSTEM AND RECEIVER USING THE SAME

BACKGROUND OF THE INVENTION

1. Field of the Invention

The present invention relates to the technical field of wireless transmission and, more particularly, to a Transmission Parameter Signaling (TPS) decoder for a Digital Video Broadcasting-Terrestrial (DVB-T) television system and the receiver using the same.

2. Description of Related Art

In addition to a broadcasting program with better picture and sound qualities and spectral efficiency, the digital television broadcasting can also provide various data services in comparison with the conventional analog television broadcasting.

With the coming digital era, the television broadcasting gradually changes from a conventional analog system to a digital system while the mobile communication is developed from the first-generation analog systems to the second-generation voice systems and then the third-generation digital multimedia systems. A digital video broadcasting (DVB) system can overcome the problems of poor receiving quality or unstable signal intensity occurred in the current analog systems and caused by the topographies and the obstacles to thereby provide a broadcasting program with better picture and sound qualities. In addition, the spectral efficiency in the DVB system is increased, and thus the data amount of programs to be broadcasted is getting higher in a limited system bandwidth. More importantly, the DVB can provide various additive services derived from the data broadcasting.

The DVB systems currently proposed can be divided into multi- and single-carrier modes. The former mostly uses the Orthogonal Frequency Division Multiplexing (OFDM) modulation technique. The receiving and decoding functions of Transmission Parameter Signaling (TPS) especially play an important role in the digital video broadcasting systems.

As an example of the Digital Video Broadcasting-Terrestrial (DVB-T) of European standard, the transmission modes include 2 k and 8 k modes. In the 2 k mode, each OFDM symbol includes 2048 subcarriers, but in application only 1705 subcarriers are active and the remaining ones that are close to two sides of the channel are reserved as a guard band. Among the 1705 subcarriers, only 1512 ones are active to transmit the Quadrature Amplitude Modulation (QAM) signals, and the remaining 193 ones are active to transmit the pilot signals. The pilot signals include 17 Transmission Parameter Signaling (TPS) pilots, 45 continual pilots and 131 scattered pilots.

Similarly, in the 8 k mode, each OFDM symbol includes 8192 subcarriers, but in application only 6817 ones are active. Only 6048 ones among the 6817 subcarriers are active to transmit the QAM signals, and the remaining 769 ones are active to transmit the pilot signals. The pilot signals include 68 TPS pilots, 177 continual pilots and 524 scattered pilots.

The TPS pilots in the DVB-T system transmit the synchronization signal and the transmission-associated parameters such as coding rates ($1/2$, $2/3$, $3/4$, $5/6$, $7/8$), QAM modulation modes (Quadrature Phase Shift Keying (QPSK), 16-QAM, 64-QAM), guard interval lengths ($1/4$ TU, $1/8$ TU, $1/16$ TU, $1/32$ TU), transmission modes (2 k, 8 k), and the like. Accordingly, the receiver can accurately decode the TPS pilots in advance, so as to ensure that the subsequently received data can be accurately decoded.

US Patent Publication No. 2006/0088111, published Apr. 27, 2006, entitled "TPS decoder in an orthogonal frequency division multiplexing receiver", discloses the channel state information (CSI) applied to the TPS decoding. As shown in the block diagram of FIG. 1, a Viterbi input processor 76 provides the CSI and outputs the CSI to a TPS decoder 66 for decoding. However, it does not disclose how to theoretically leverage the CSI and the input signals to achieve the best TPS decoding function, and how to properly and effectively design the system to obtain the best TPS decoding function with the use of an equalizer.

Therefore, it is desirable to provide an improved TPS decoder for an OFDM-based system to mitigate and/or obviate the aforementioned problems.

SUMMARY OF THE INVENTION

The object of the present invention is to provide a Transmission Parameter Signaling (TPS) decoder for a Digital Video Broadcasting-Terrestrial (DVB-T) television system, which can obtain the best TPS decoding performance with the help of known channel state information (CSI). In addition, the invention can be applied in an Orthogonal Frequency Division Multiplexing (OFDM)-based system for a TPS decoding.

According to a feature of the invention, a Transmission Parameter Signaling (TPS) decoder for a Digital Video Broadcasting-Terrestrial (DVB-T) television system is provided, which includes an input signal estimator, a masking device, a vector index determinator and a lookup table device. The input signal estimator receives a plurality of frequency-domain input signals and a plurality of channel measure signals to thereby produce a plurality of estimated input signals, wherein the frequency-domain input signals correspond to TPS signals of a frame. The masking device is connected to the input signal estimator in order to perform a masking operation on the estimated input signals to thereby produce a plurality of masking signals. The vector index determinator is connected to the masking device in order to depend on the masking signals to determine a vector index corresponding to the frequency-domain input signals. The lookup table device is connected to the vector index determinator in order to depend on the vector index to thereby produce a codeword.

According to another feature of the invention, a receiver of Digital Video Broadcasting-Terrestrial (DVB-T) television system is provided, which includes an antenna, a radio frequency (RF) front end, an analog to digital converter, a pre-synchronizer, a filter, a synchronizer, a channel estimator, a frame body processor, a Fast Fourier Transform (FFT) device and a TPS decoder. The antenna receives a radio signal. The RF front end is connected to the antenna in order to reduce the radio signal from a radio frequency down to a baseband to thereby produce a baseband signal. The analog to digital converter is connected to the RF front end in order to perform an analog to digital conversion on the baseband signal to thereby produce an in-phase part and a quadrature-phase part. The pre-synchronizer is connected to the analog to digital converter in order to depend on an estimation of the synchronizer to compensate an output signal of the analog to digital converter. The pre-synchronizer includes a digital mixer and an interpolator. The digital mixer performs frequency offset compensation. The interpolator is connected to the digital mixer in order to perform a timing offset compensation. The filter is connected to the pre-synchronizer in order to filter outband noises to thereby produce a filtering signal. The synchronizer is connected to the filter in order to depend on the filtering signal to perform all system synchronization required for the receiver. The channel estimator is connected to the filter in order to perform a channel measurement on a transmission channel to thereby produce a channel measure signal. The frame body processor is connected to the filter and the channel estimator in order to perform a frame body processing based on the channel measure signal produced by the channel estimator, and use the synchronization to find a best timing position on a frame body and to eliminate an interference caused by a frame header. The FFT device is connected to the frame body processor in order to perform a fast Fourier transformation on an output signal of the frame body processor to thereby produce a plurality of frequency-domain input signals. The TPS decoder is connected to the FFT device and the channel estimator in order to produce a TPS vector based on the frequency-domain input signals, wherein the frequency-domain input signals correspond to TPS signals of a frame.

Other objects, advantages, and novel features of the invention will become more apparent from the following detailed description when taken in conjunction with the accompanying drawings.

BRIEF DESCRIPTION OF THE DRAWINGS

FIG. 3 is a schematic diagram of signals of the first frame sent by a transmitter of a conventional DVB-T television system;

FIG. 4 is a schematic diagram of signals of an l-th frame sent by a transmitter of a standard DVB-T television system;

DETAILED DESCRIPTION OF THE PREFERRED EMBODIMENT

Figure 1:
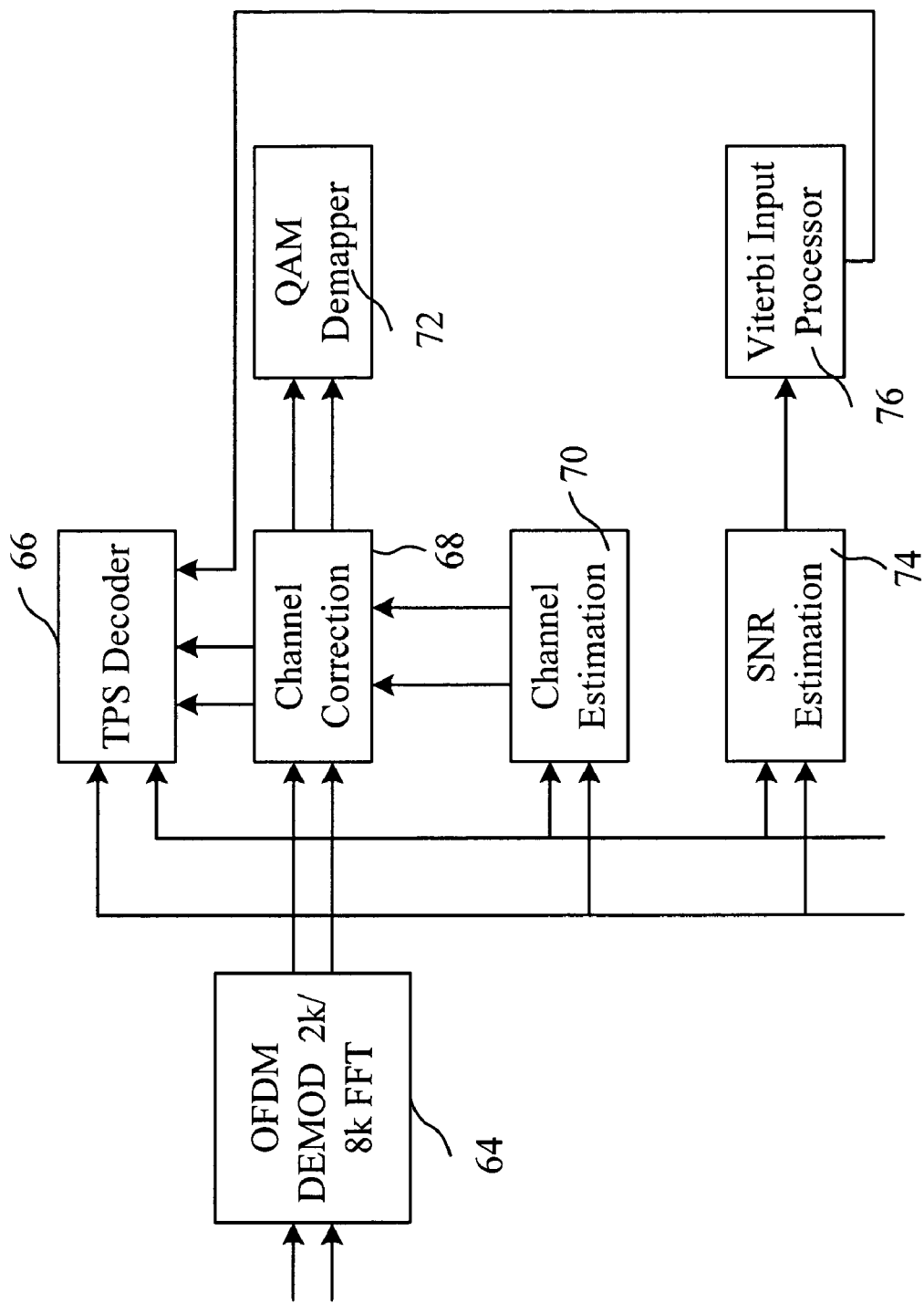
FIG. 1 is a schematic diagram of a typical TPS decoding.
Figure 2:
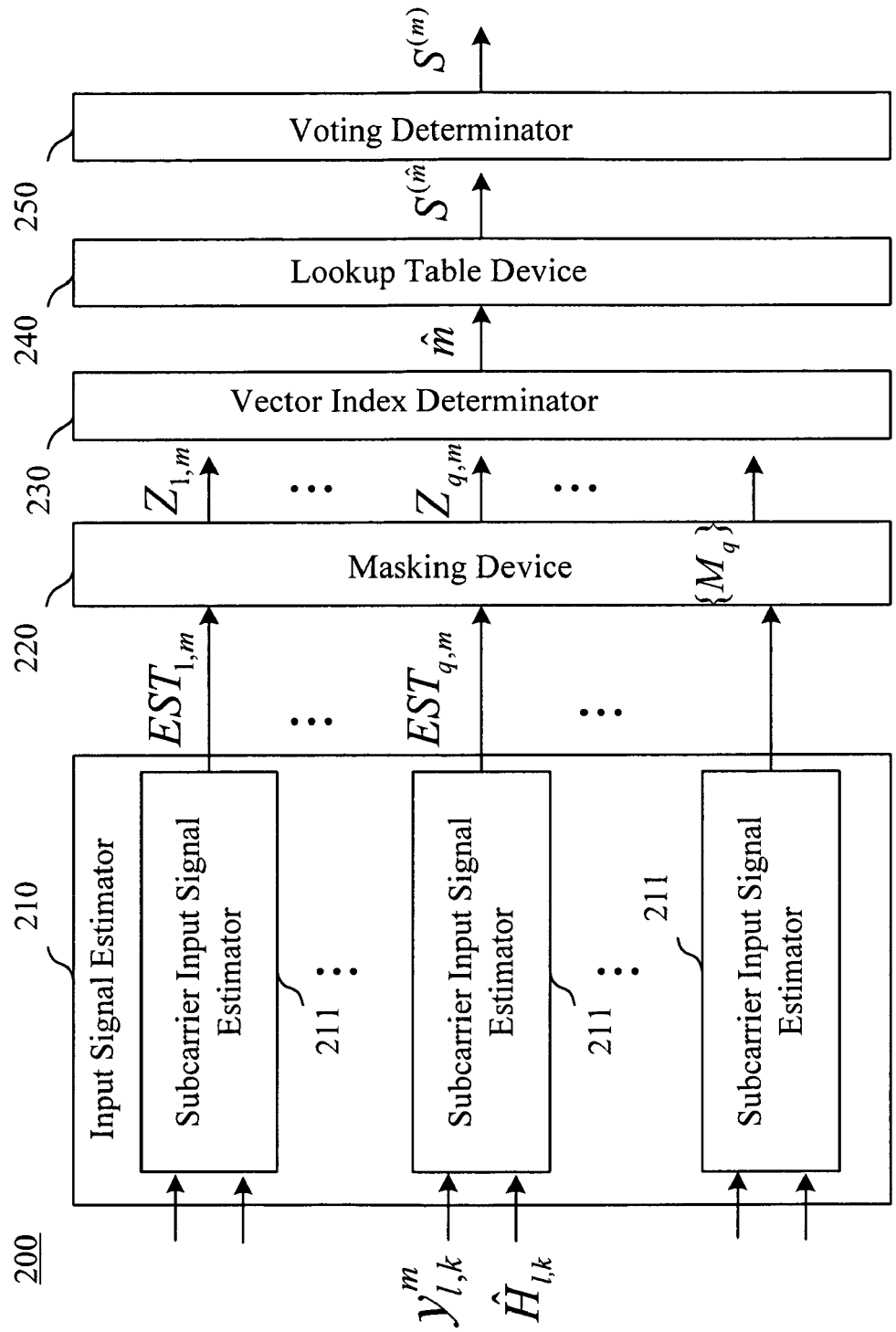
FIG. 2 is a block diagram of a Transmission Parameter Signaling (TPS) decoder for a Digital Video Broadcasting-Terrestrial (DVB-T) television system according to an embodiment of the invention.

FIG. 2 is a block diagram of a Transmission Parameter Signaling (TPS) decoder 200 for a Digital Video Broadcasting-Terrestrial (DVB-T) television system according to an embodiment of the invention, which is at a multi-carrier mode. The TPS decoder 200 includes an input signal estimator 210, a masking device 220, a vector index determinator 230, a lookup table device 240 and a voting determinator 250.

The input signal estimator 210 receives a plurality of frequency-domain input signals $y_{l,k}^m$ and a plurality of channel measure signals $\hat{H}_{l,k}$ to thereby produce a plurality of estimated input signals $EST_{q,m}$, wherein the frequency-domain input signals $y_{l,k}^m$ correspond to TPS signals of a frame in wireless transmission, l indicates a frame index for the frame, k indicates a subcarrier index, and m indicates a TPS vector index. For an 8 k mode, where k=1~68, the subcarrier with the index of k=1 is used to send a reference bit, and the subcarriers with the indexes of k=2~68 are used to send 67 TPS bits. In this embodiment, the frequency domain input signals $y_{l,k}^m$ is denoted by $Y_m$, i.e., $Y_m \equiv \{y_{l,k}^m\}$, and the channel measure signals $\hat{H}_{l,k}$ is denoted by $\hat{H}$, i.e., $\hat{H} \equiv \{\hat{H}_{l,k}\}$.

The input signal estimator 210 is based on Equation (1) expressed as follows to estimate the frequency domain input signals to thereby produce the estimated input signals:

$$EST_{q,m} = \sum_{l=2} d_l^q \sum_k b_k \cdot \operatorname{Re}\{y_{l,k}^m \cdot (\hat{H}_{l,k})^*\}, \quad (1)$$

where $EST_{q,m}$ indicates the estimated input signals, $y_{l,k}^m$ indicates the frequency domain input signals, $\hat{H}_{l,k}$ indicates the channel measure signals, $b_k = a_1^m$ in which m indicates a m-th TPS vector, and $$d_l^q = \prod_{i=2}^{l} a_i^q$$

in which $a_k^q$ indicates vector parts corresponding to the frequency domain input signals in transmission and $q=2^0, \ldots, 2^{67}$.

The symbol l indicates an l-th time frame with signals sent by the transmitter of the DVB-T television system. Let $x_{l,k}^m$ to indicate that the signals of the l-th frame of the m-th TPS vector are sent through the k-th subcarrier. In the DVB-T system, each TPS vector contains one reference bit and 67 TPS bits. It is determined that $S^{(i)} \equiv \{S_l^{(i)}\}$ for i indicates an i-th TPS vector, i.e., $S^{(i)} \equiv \{S_l^{(i)}|1 \leq l \leq 68\}$. Next, $S \equiv \{S^{(i)}\}$ is defined as a set of TPS vectors, and $W \equiv \{w_k\}$ is defined as a reference vector for $w_k \subset \{0,1\}$. Namely, the reference vector W is a symbol firstly sent after a Differential Binary Phase Shift Keying (DBPSK) modulation.

FIG. 3 is a schematic diagram of signals of the first frame sent by a transmitter of a conventional DVB-T television system. The first frame sends a reference vector W. Accordingly, the transmission signal $x_{l,k}^m$ in FIG. 3 can be expressed as follows:

$$x_{1,k}^m = a_{1,k}^m = 1 - 2w_k = b_k, \ w_k \in \{0,1\}. \quad (2)$$

Namely, $b_k = 1 - 2w_k$, and the corresponding frequency domain input signals $y_{l,k}^m$ can be expressed as follows:

$$y_{1,k}^m = x_{1,k}^m \cdot \hat{H}_{1,k} + n_{1,k} = b_k \cdot \hat{H}_{1,k} + n_{1,k}, \quad (3)$$

where $\hat{H}_{1,k}$ indicates the channel measure signals, $n_{1,k}$ indicates noises, and $w_k$ indicates parts of the reference vector W. As shown in FIG. 3, the binary $w_k$ is changed into the bipolar $a_{1,k}^m$, and performs a BPSK to thereby produce the transmission signals $x_{1,k}^m$.

FIG. 4 is a schematic diagram of the signals $x_{1,k}^m$ of an l-th frame sent by a transmitter of a standard DVB-T television system, for l>1. The l-th frame is used to send the parts $S_l^{(m)}$ of the m-th TPS vector. In FIG. 4, the transmission signals $x_{1,k}^m$ can be expressed as follows:

$$x_{l,k}^m = \prod_{i=1}^{l} a_i^m = a_1^m \cdot \prod_{i=2}^{l} a_i^m, \ l > 1, \quad (4)$$

where $a_l^m = 1 - 2 \cdot S_l^{(m)}$, i.e., $$S_i^{(m)} = \frac{1}{2} \cdot (1 - a_i^m).$$

In this case, the invention defines a parameter $d_l^m$ as follows:

$$d_l^m \equiv \prod_{i=2}^{l} a_i^m = a_1^m \cdot x_{l,k}^m = b_k \cdot x_{l,k}^m, \ l > 1. \quad (5)$$

By means of the parameter $d_l^m$ and corresponding simplification, the transmission signals $x_{1,k}^m$ can be rewritten as:

$$x_{l,k}^m = a_1^m \cdot d_l^m = b_k \cdot d_l^m, \ l > 1, \quad (6)$$

and the corresponding frequency domain input signals $y_{l,k}{}^m$ can be expressed as:

$$y_{l,k}{}^m = x_{l,k}{}^m \cdot \hat{H}_{l,k} + n_{l,k} = b_k \cdot d_l{}^m \cdot \hat{H}_{l,k} + n_{l,k}, \quad l>1 \quad (7)$$

where $\hat{H}_{l,k}$ indicates the channel measure signals, $n_{l,k}$ indicates noises, and $b_k = 1 - 2w_k$.

Let $D_m \equiv \{d_l^m\}$, $A_m \equiv \{a_l^m\}$ and $S^{(m)} \equiv \{s_l^{(m)}\}$, where $d_l^m$, $a_l^m$, $s_l^{(m)}$ can be obtained by:

$$d_l^m = \prod_{i=2}^{l} a_i^m,$$

$$l=2 \Rightarrow d_2^m = a_2^m \leftrightarrow a_2^m = d_2^m,$$

$$l=3 \Rightarrow d_3^m = (a_2^m) a_3^m = d_2^m a_3^m \leftrightarrow a_3^m = d_2^m d_3^m,$$

$$l=4 \Rightarrow d_4^m = (a_2^m a_3^m) a_4^m = d_3^m a_4^m \leftrightarrow a_4^m = d_3^m d_4^m,$$

$$\vdots$$

$$\Rightarrow a_l^m = a_{l-1}^m d_l^m,$$

$$\Rightarrow s_l^{(m)} = \frac{1}{2} \cdot (1 - a_l^m) = \frac{1}{2} \cdot (1 - a_{l-1}^m d_l^m),$$

That is, the invention detects $D_m(D_m \equiv \{d_l^m\})$ through $Y_m(Y_m \equiv \{y_{l,k}{}^m\})$ and $\hat{H}$ ($\hat{H} \equiv \{\hat{H}_{l,k}\}$) to thereby find $A_m \equiv \{a_l^m\}$ and $S^{(m)} \equiv \{S_l^{(m)}\}$.

The input signal estimator 210 has q TPS subcarrier input signal estimators 211 for respectively receiving the frequency domain input signals $y_{l,k}{}^m$ and the channel measure signals $\hat{H}_{l,k}$ to thereby produce q estimated input signals $EST_{q,m}$ in which:

$$EST_{q,m} = \sum_{l=2} d_l^q \sum_{k} b_k \cdot \text{Re}\{y_{l,k}^m \cdot (\hat{H}_{l,k})^*\}, \quad (8)$$

where $EST_{q,m}$ indicates the estimated input signals, $y_{l,k}{}^m$ indicates the frequency domain input signals, $\hat{H}_{l,k}$ indicates the channel measure signals, $b_k = a_l^m$, and $$d_l^q = \prod_{i=2}^{l} a_i^q$$

in which $a_k^q$ indicates vector parts corresponding to the frequency domain input signals in transmission and $q = 2^0, \ldots, 2^{67}$.

In this embodiment, the q frequency domain input signals $y_{l,k}{}^m$ are not processed by channel equalization. It is known according to the Maximum A Posterior (MAP) criteria that an index $\hat{m}$ for the codeword corresponding to the q frequency domain input signals $y_{l,k}{}^m$ can be expressed as:

$$\hat{m} = \arg \max_{q} M_q \sum_{l=2} d_l^q \sum_{k} b_k \cdot \text{Re}\{y_{l,k}^m \cdot (\hat{H}_{l,k})^*\}, \quad (9)$$

$$\text{where} \sum_{l=2} d_l^q \sum_{k} b_k \cdot \text{Re}\{y_{l,k}^m \cdot (\hat{H}_{l,k})^*\}$$

indicates functions performed by the q subcarrier input signal estimators 211, which essentially produces the q estimated input signals $EST_{q,m}$.

Figure 5:
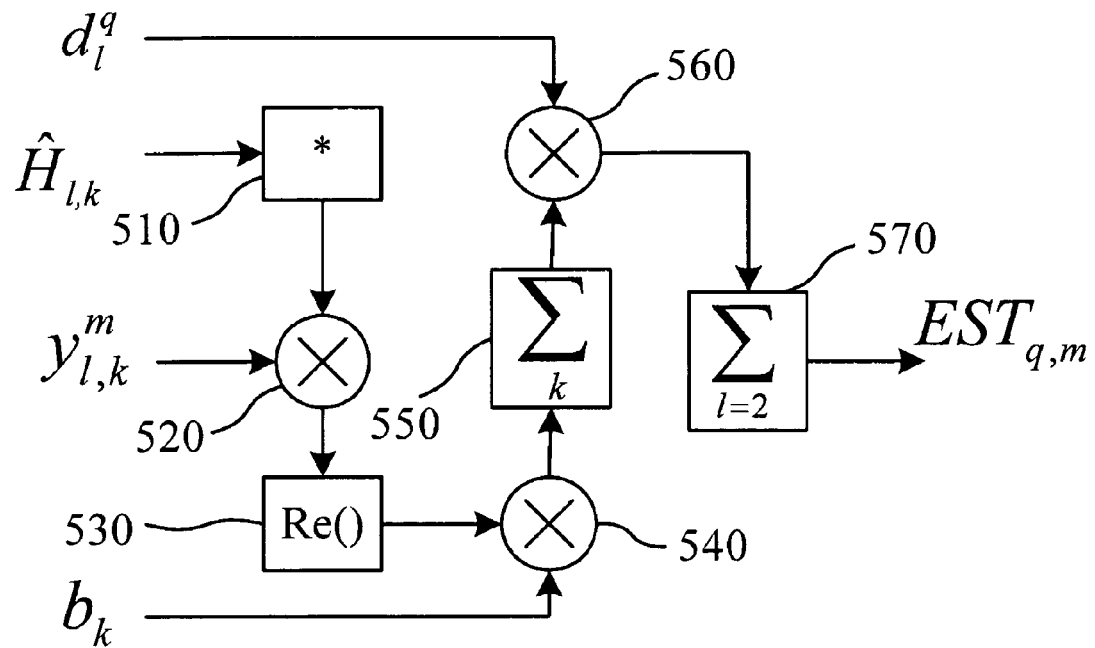
FIG. 5 is a block diagram of a subcarrier input signal estimator according to an embodiment of the invention.

FIG. 5 is a block diagram of a k-th subcarrier input signal estimator 211 according to an embodiment of the invention. In FIG. 5, the subcarrier input signal estimator 211 includes a complex conjugate generator 510, a first multiplier 520, a real number extractor 530, a second multiplier 540, a first accumulator 550, a third multiplier 560 and a second accumulator 570.

The complex conjugate generator 510 receives the channel measure signals $\hat{H}_{l,k}$ and produces a plurality of complex conjugate channel measure signals $\hat{H}_{l,k}{}^*$.

The first multiplier 520 performs multiplication of the frequency domain input signals $y_{l,k}{}^m$ and the complex conjugate channel measure signals $\hat{H}_{l,k}{}^*$ to thereby produce a first multiplication signal $y_{l,k}{}^m \cdot \hat{H}_{l,k}{}^*$.

The real number extractor 530 is connected to the first multiplier 520 in order to extract a real part from the first multiplication signal $y_{l,k}{}^m \cdot \hat{H}_{l,k}{}^*$ to thereby produce a real number signal $\text{Re}\{y_{l,k}{}^m \cdot \hat{H}_{l,k}{}^*\}$.

The second multiplier 540 is connected to the real number extractor 530 in order to perform multiplication of the real number signal $\text{Re}\{y_{l,k}{}^m \cdot \hat{H}_{l,k}{}^*\}$ and $b_k$ to thereby produce a second multiplication signal $b_k \cdot \text{Re}\{y_{l,k}{}^m \cdot \hat{H}_{l,k}{}^*\}$.

The first accumulator 550 is connected to the second multiplier 540 in order to accumulate the second multiplication signal $b_k \cdot \text{Re}\{y_{l,k}{}^m \cdot \hat{H}_{l,k}{}^*\}$ to thereby produce a first accumulation signal $$\sum_{k} b_k \cdot \text{Re}\{y_{l,k}^m \cdot \hat{H}_{l,k}^*\}.$$

The third multiplier 560 is connected to the first accumulator 550 in order to perform multiplication of the first accumulation signal $$\sum_{k} b_k \cdot \text{Re}\{y_{l,k}^m \cdot \hat{H}_{l,k}^*\}$$

and $d_l^q$ to thereby produce a third multiplication signal $$d_l^q \cdot \sum_{k} b_k \cdot \text{Re}\{y_{l,k}^m \cdot \hat{H}_{l,k}^*\}.$$

The second accumulator 570 is connected to the third multiplier 560 in order to accumulate the third multiplication signal $$d_l^q \cdot \sum_{k} b_k \cdot \text{Re}\{y_{l,k}^m \cdot \hat{H}_{l,k}^*\}$$

to thereby produce the estimated input signals $$\sum_{l=2} d_l^q \cdot \sum_{k} b_k \cdot \text{Re}\{y_{l,k}^m \cdot \hat{H}_{l,k}^*\} = EST_{q,m}.$$

The masking device 220 is connected to the input signal estimator 210 in order to perform a masking operation on the estimated input signals to thereby produce a plurality of masking signals $Z_{q,m}$.

The masking operation is performed by Equation (10) as follows:

$$Z_{q,m} = M_q \cdot EST_{q,m}, \quad (10)$$

where $Z_{q,m}$ indicates the masking signals, $M_q=1$ when a vector corresponding to the frequency domain input signals in transmission is an active TPS vector set $S_a$, and $M_q=0$ when the vector corresponding to the frequency domain input signals in transmission is not the active TPS vector set $S_a$.

The function $M_q$ can be expressed as:

$$M_q = \begin{cases} 1, & S^{(q)} \in S_a \\ 0, & S^{(q)} \notin S_a. \end{cases} \quad (11)$$

The vector index determinator 230 is connected to the masking device 220 in order to depend on the masking signals $Z_{q,m}$ to determine a vector index $\hat{m}$ corresponding to the frequency-domain input signals.

Figure 6:
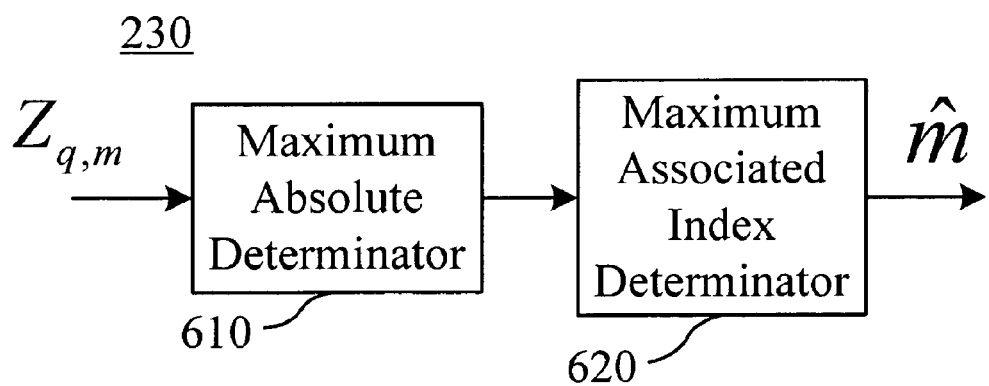
FIG. 6 is a block diagram of a vector index determinator according to an embodiment of the invention.

FIG. 6 is a block diagram of a vector index determinator 230 according to an embodiment of the invention. The vector index determinator 230 includes a maximum absolute determinator 610 and a maximum associated index determinator 620.

The maximum absolute determinator 610 is connected to the masking device 220 in order to depend on the masking signals $Z_{q,m}$ to determine a maximum absolute of the masking signals by an equation:

$$Z_m^{Max} \equiv \max_{S^{(q)} \in S_a} |Z_{q,m}|,$$

where $Z_{q,m}$ indicates the masking signals, $S_a$ indicates the active TPS vector set, $S^{(q)}$ indicates the vector corresponding to the frequency domain input signals in transmission, and $Z_m^{Max}$ indicates the maximum absolute of the masking signals.

The maximum associated index determinator 620 is based on the maximum absolute $Z_m^{Max}$ to determine the vector index $\hat{m}$ by an equation:

$$\hat{m} \equiv \arg_q(Z_m^{Max}) = \arg_q\left(\max_{S^{(q)} \in S_a} |Z_{q,m}|\right).$$

The lookup table device 240 is connected to the vector index determinator 230 in order to depend on the vector index to produce a codeword $S^{(\hat{m})}$.

The voting determinator 250 is connected to the lookup table device 240 in order to depend on a plurality of codewords $S^{(\hat{m})}$ outputted by the lookup table device 240 to select the codeword with the maximum probability as an output.

Figure 7:
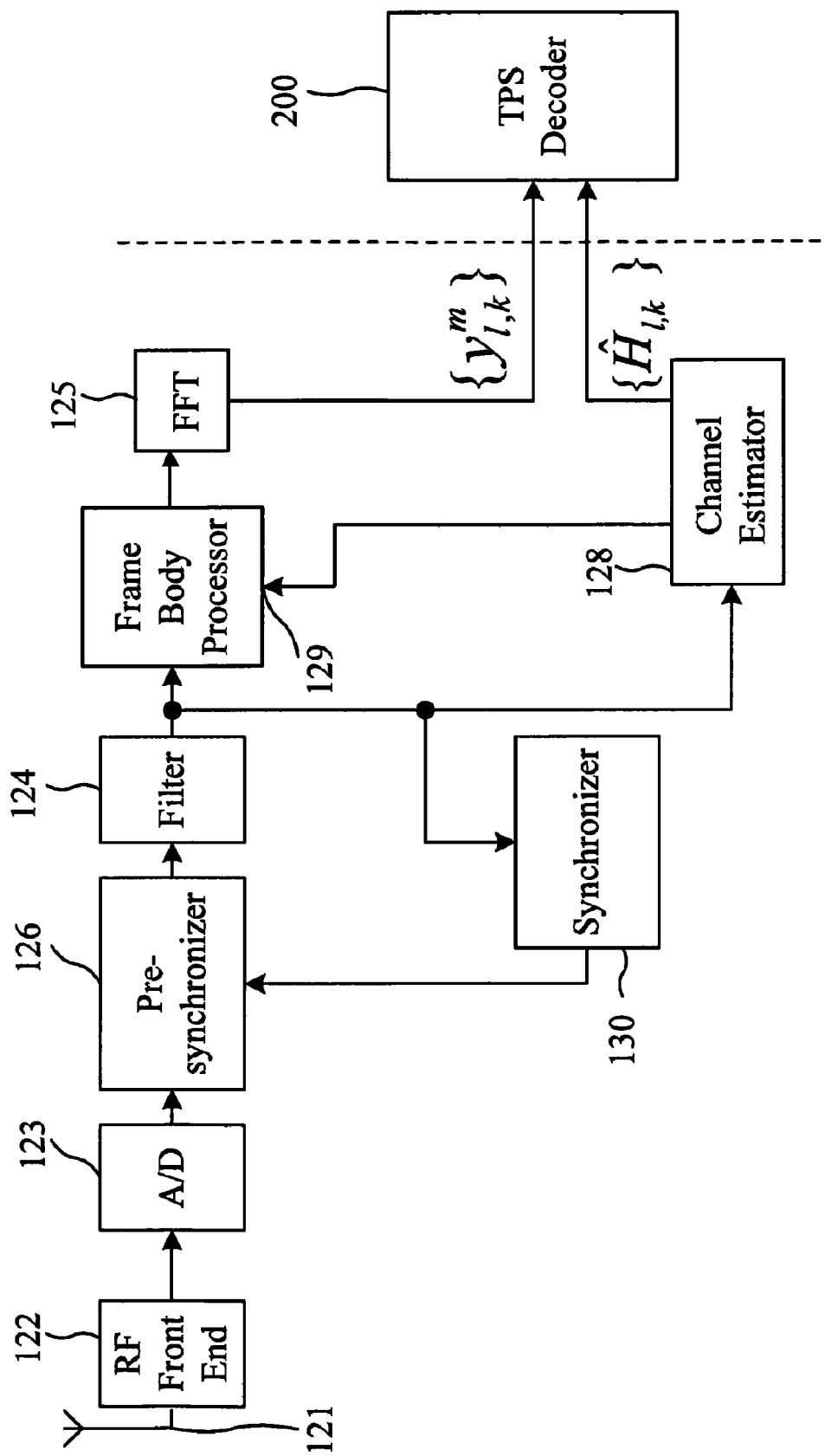
FIG. 7 is a schematic diagram of a TPS decoder applied to a receiver of DVB-T television system in Orthogonal Frequency Division Multiplexing (OFDM) according to the invention.

FIG. 7 is a schematic diagram of a TPS decoder 200 applied to a receiver of DVB-T television system in an Orthogonal Frequency Division Multiplexing (OFDM) according to the invention. In FIG. 7, the TPS decoder 200 is shown on the right side of the dotted line while the components of the receiver of DVB-T television system is shown on the left side. As shown in FIG. 7, the receiver includes an antenna 121, a radio frequency (RF) front end 122, an analog to digital (A/D) converter 123, a pre-synchronizer 126, a filter 124, a frame body processor 129, a synchronizer 130, a Fast Fourier Transform (FFT) device 125 and a channel estimator 128.

The antenna 121 receives a radio signal. The RF front end 122 is connected to the antenna in order to down-convert the radio signal centered at a radio frequency to baseband to thereby produce a baseband signal. The A/D converter 123 is connected to the RF front end in order to perform an analog to digital conversion on the baseband signal to thereby produce an in-phase part and a quadrature-phase part. The pre-synchronizer 126 is connected to the A/D converter 123 in order to accord to an estimation of the synchronizer to compensate an output signal of the A/D converter. The pre-synchronizer includes a digital mixer (not shown) and an interpolator (not shown). The digital mixer performs frequency offset compensation. The interpolator is connected to the digital mixer in order to perform a timing offset compensation. The filter 124 is connected to the pre-synchronizer 126 in order to filter off outband noises. The synchronizer 130 is connected to the output of the filter 124 in order to perform all system synchronization required for the receiver. The channel estimator 128 is connected to the output of the filter 124 in order to perform a channel measurement on transmission channels to thereby produce the channel measure signals. The frame body processor 129 is connected to the filter and the channel estimator in order to perform a frame body processing based on the channel measure signals produced by the channel estimator 128, and use the synchronization to find a best timing position on a frame body and to eliminate an interference caused by a frame header. The FFT device 125 is connected to the frame body processor 129 in order to perform a fast Fourier transformation on an output signal of the frame body processor 129 to thereby produce the frequency-domain input signals $\{y_{l,k}^m\}$.

In the DVB-T television system, the TPS vector is comprised of one known reference bit and 67 TPS bits. Accordingly, decoding is performed on a part of the 67 TPS bits and subsequently on the remaining TPS bits for reducing the hardware complexity and gaining a sub-optimum. Namely, the TPS decoder can perform an n-stage decoding in which the k-th stage is employed to decode $e_k$ TPS bits, i.e., $$\sum_{k=1}^{n} e_k = 67.$$

This can be implemented easily by those skilled in the art and thus a detailed description is deemed unnecessary.

As cited, the prior art does not describe how to theoretically leverage the channel state information to achieve the best TPS decoding performance explicitly. To overcome this, the invention discloses the frequency domain input signals $Y_m = \{y_{l,k}^m\}$ and the channel measure signals $\hat{H} = \{\hat{H}_{l,k}\}$ to thereby obtain the best TPS decoding performance.

Although the present invention has been explained in relation to its preferred embodiment, it is to be understood that many other possible modifications and variations can be made without departing from the spirit and scope of the invention as hereinafter claimed.

What is claimed is:

1. A Transmission Parameter Signaling (TPS) decoder, for a Digital Video Broadcasting-Terrestrial (DVB-T) television system, comprising:

an input signal estimator, for receiving a plurality of frequency-domain input signals and a plurality of channel measure signals to produce a plurality of estimated input signals, wherein the frequency-domain input signals correspond to TPS signals from a frame and the estimated input signals produced by the input signal estimator are expressed as:

$$EST_{q,m} = \sum_{l=2} d_l^q \sum_k b_k \cdot \text{Re}\{y_{l,k}^m \cdot (\hat{H}_{l,k})^*\},$$

where $EST_{q,m}$ indicates the estimated input signals, $Y_{l,k}^m$ indicates the frequency domain input signals, $\hat{H}_{l,k}$ indicates the channel measure signals, $b_k = a_1^m$, and $$d_l^q = \prod_{i=2}^{l} a_i^q$$

in which $a_k^q$ indicates vector parts corresponding to the frequency domain input signals in transmission, and $q=2^0, \ldots, 2^{67}$;

a masking device, connected to the input signal estimator, for performing a masking operation on the estimated input signals to produce a plurality of masking signals;

a vector index determinator, connected to the masking device, for determining a vector index corresponding to the frequency-domain input signals according to the masking signals; and a lookup table device connected to the vector index determinator for producing a codeword according to the vector index.

2. The TPS decoder as claimed in claim 1, wherein the masking signals produced by performing the masking operation are expressed as:

$$Z_{q,m} = M_q \cdot EST_{q,m},$$

where $Z_{q,m}$ indicates the masking signals, $M_q=1$ when a vector corresponding to the frequency domain input signals in transmission is an active TPS vector set, and $M_q=0$ when the vector corresponding to the frequency domain input signals in transmission is not the active TPS vector set.

3. The TPS decoder as claimed in claim 1, wherein the vector index determinator comprises:

a maximum absolute determinator, connected to the masking device, for determining a maximum absolute of the masking signals according to the masking signals; and a maximum associated index determinator, for determining a vector index corresponding to the maximum absolute of the masking signals.

4. The TPS decoder as claimed in claim 3, wherein the maximum absolute produced by the maximum absolute determinator is expressed as:

$$Z_m^{Max} \equiv \text{Max}_{S^{(q)} \in S_a} |Z_{q,m}|,$$

where $Z_{q,m}$ indicates the masking signals, $S_a$ indicates an active TPS vector set, $S^{(q)}$ indicates the vector corresponding to the frequency domain input signals in transmission, and $Z_m^{Max}$ indicates the maximum absolute of the masking signals.

5. The TPS decoder as claimed in claim 4, wherein the vector index produced by the maximum associated index determinator is expressed as:

$$\hat{m} \equiv \arg_q(Z_m^{Max}) = \arg_q\left(\text{Max}_{S^{(q)} \in S_a} |Z_{q,m}|\right),$$

where $\hat{m}$ indicates the vector index.

6. The TPS decoder as claimed in claim 1, wherein the input signal estimator comprises a plurality of subcarrier input signal estimators, and each subcarrier input signal estimator includes:

a complex conjugate generator, for receiving the channel measure signals $\hat{H}_{l,k}$ and producing a plurality of complex conjugate channel measure signals $\hat{H}_{l,k}^*$;

a first multiplier, for performing multiplication of the frequency domain input signals $y_{l,k}^m$ and the complex conjugate channel measure signals $\hat{H}_{l,k}^*$ to produce a first multiplication signal $y_{l,k}^m \cdot (\hat{H}_{l,k})^*$;

a real number extractor, connected to the first multiplier, for extracting a real part from the first multiplication signal $y_{l,k}^m \cdot (\hat{H}_{l,k})^*$ to produce a real number signal $\text{Re}\{y_{l,k}^m \cdot (\hat{H}_{l,k})^*\}$;

a second multiplier, connected to the real number extractor, for performing multiplication of the real number signal $\text{Re}\{y_{l,k}^m \cdot (\hat{H}_{l,k})^*\}$ and $b_k$ to produce a second multiplication signal $b_k \cdot \text{Re}\{y_{l,k}^m \cdot (\hat{H}_{l,k})^*\}$;

a first accumulator, connected to the second multiplier, for accumulating the second multiplication signal $b_k \cdot \text{Re}\{y_{l,k}^m \cdot (\hat{H}_{l,k})^*\}$ to produce a first accumulation signal $$\sum_k b_k \cdot \text{Re}\{y_{l,k}^m \cdot (\hat{H}_{l,k})^*\};$$

a third multiplier, connected to the first accumulator, for performing multiplication of the first accumulation signal $$\sum_k b_k \cdot \text{Re}\{y_{l,k}^m \cdot (\hat{H}_{l,k})^*\}$$

and $d_l^q$ to thereby produce a third multiplication signal $$d_l^q \cdot \sum_k b_k \cdot \text{Re}\{y_{l,k}^m \cdot (\hat{H}_{l,k})^*\};$$

a second accumulator, connected to the third multiplier, for accumulating the third multiplication signal $$d_l^q \cdot \sum_k b_k \cdot \text{Re}\{y_{l,k}^m \cdot (\hat{H}_{l,k})^*\}$$

to produce the estimated input signals.

7. The TPS decoder as claimed in claim 1, further comprising a voting determinator connected to the lookup table device, for depending on a plurality of codewords outputted by the lookup table device to select a codeword with the maximum probability as an output.

8. The TPS decoder as claimed in claim 1, further applied to a receiver of DVB-T television system, the receiver comprising:

an antenna for receiving a radio signal;

a radio frequency (RF) front end, connected to the antenna, for down-converting the radio signal centered at a radio frequency to baseband so as to produce a baseband signal;

an analog to digital converter, connected to the RF front end, for performing an analog to digital conversion on the baseband signal to produce an in-phase part and a quadrature-phase part;

a pre-synchronizer, connected to the analog to digital converter, for compensating an output signal of the analog to digital converter;

a filter, connected to the pre-synchronizer, for filtering off outband noises so as to produce a filtering signal;

a synchronizer, connected to the filter, for depending on the filtering signal to perform a synchronization required for the receiver;

a channel estimator, connected to the filter, for performing a channel measurement on a transmission channel to produce a channel measure signal;

a frame body processor, connected to the filter and the channel estimator, for performing a frame body processing based on the channel measure signal produced by the channel estimator, and using the synchronization to find a best timing position on a frame body and to eliminate an interference caused by a frame header; and a fast Fourier transform (FFT) device, connected to the frame body processor, for performing a fast Fourier transformation on an output signal of the frame body processor to produce a plurality of frequency-domain input signals;

wherein the TPS decoder connected to the FFT device and the channel estimator, for producing a TPS vector based on the frequency-domain input signals.

9. The receiver as claimed in claim 8, wherein the pre-synchronizer comprises a digital mixer for performing a frequency offset compensation and an interpolator connected to the digital mixer for performing timing offset compensation.

10. The receiver as claimed in claim 9, wherein the TPS decoder performs a n-stage decoding in which a k-th stage performs a decoding on $e_k$ TPS bits, where $$\sum_{k=1}^{n} e_k = 67.$$

* * * * *